US012696191B2

(12) United States Patent
Kadan Veedu et al.

(10) Patent No.: US 12,696,191 B2
(45) Date of Patent: Jul. 28, 2026

(54) SIGNALING OPTIMIZATIONS FOR WIRELESS DEVICES OPERATING ON HARVESTED ENERGY

(71) Applicant: Telefonaktiebolaget LM Ericsson (publ), Stockholm (SE)

(72) Inventors: Sandeep Narayanan Kadan Veedu, Järfälla (SE); Saeedeh Moloudi, Linköping (SE); Kittipong Kittichokechai, Järfälla (SE); Mohammad Mozaffari, Fremont, CA (US); Tuomas Tirronen, Helsinki (FI); Olof Liberg, Enskede (SE); Mattias Bergström, Sollentuna (SE); Andreas Höglund, Solna (SE); Stefan Wänstedt, Luleå (SE); Sina Maleki, Malmö (SE); Yi-Ju Chen, Solna (SE); Yi-Pin Eric Wang, Fremont, CA (US); Johan Bergman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 309 days.

(21) Appl. No.: 18/569,375

(22) PCT Filed: Jun. 14, 2022

(86) PCT No.: PCT/SE2022/050584
§ 371 (c)(1),
(2) Date: Dec. 12, 2023

(87) PCT Pub. No.: WO2022/265567
PCT Pub. Date: Dec. 22, 2022

(65) Prior Publication Data
US 2024/0276376 A1 Aug. 15, 2024

Related U.S. Application Data

(60) Provisional application No. 63/210,373, filed on Jun. 14, 2021.

(51) Int. Cl.
H04W 52/02 (2009.01)

(52) U.S. Cl.
CPC ... H04W 52/0229 (2013.01); H04W 52/0277 (2013.01)

(58) Field of Classification Search
None
See application file for complete search history.

(56) References Cited

U.S. PATENT DOCUMENTS

| | | | |
|---|---|---|---|
| 2015/0201342 A1 | 7/2015 | Vannithamby | |
| 2020/0322929 A1* | 10/2020 | Bagheri | H04L 5/0053 |
| 2022/0352751 A1* | 11/2022 | Elshafie | H02J 50/23 |

OTHER PUBLICATIONS

International Search Report and Written Opinion dated Nov. 9, 2022 for International Application No. PCT/SE2022/050584 filed Jun. 14, 2022; consisting of 14 pages.
(Continued)

*Primary Examiner* — Christine T Duong
(74) *Attorney, Agent, or Firm* — Weisberg I.P. Law, P.A.

(57) ABSTRACT

A method, system and apparatus are disclosed. A network node is provided. The network node is configured to communicate with a wireless device where the network node is configured to, and/or comprising a radio interface and/or comprising processing circuitry configured to receive a first indication indicating that the wireless device is an energy harvesting wireless device and to perform at least one action associated with energy harvesting at the wireless device based at least on the first indication.

19 Claims, 7 Drawing Sheets

(56) References Cited

OTHER PUBLICATIONS

3GPP TSG RAN Meeting #91e RP-210918, Revision of RP-210894; Title: Revised WID on support of reduced capability NR devices; Source: Nokia, Ericsson; Document for: Approval; Agenda Item: 9.7.27; Date and Location: Mar. 22-26, 2021, Electronic Meeting; consisting of 12 pages.

3GPP TS 38.300 V16.5.0; 3rd Generation Partnership Project; Technical Specification Group Radio Access Network; NR; NR and NG-RAN Overall Description; Stage 2 (Release 16); Mar. 2021; consisting of 151 pages.

3GPP TS 36.331 V16.4.0; 3rd Generation Partnership Project; Technical Specification Group Radio Access Network; Evolved Universal Terrestrial Radio Access (E-UTRA); Radio Resource Control (RRC); Protocol specification (Release 16); Mar. 2021; consisting of 1087 pages.

3GPP TS 36.306 V16.4.0; 3rd Generation Partnership Project; Technical Specification Group Radio Access Network; Evolved Universal Terrestrial Radio Access (E-UTRA); User Equipment (UE) radio access capabilities (Release 16); Mar. 2021; consisting of 146 pages.

3GPP TR 38.875 V17.0.0; 3rd Generation Partnership Project; Technical Specification Group Radio Access Network; Study on support of reduced capability NR devices (Release 17); Mar. 2021; consisting of 135 pages.

3GPP TS 38.133 V16.7.0; 3rd Generation Partnership Project; Technical Specification Group Radio Access Network; NR; Requirements for support of radio resource management (Release 16); Mar. 2021; consisting of 1327 pages.

3GPP TS 38.101-1 V16.7.0; 3rd Generation Partnership Project; Technical Specification Group Radio Access Network; NR; User Equipment (UE) radio transmission and reception; Part 1: Range 1 Standalone (Release 16); Mar. 2021; consisting of 448 pages.

3GPP TS 38.101-2 V16.7.0; 3rd Generation Partnership Project; Technical Specification Group Radio Access Network; NR; User Equipment (UE) radio transmission and reception; Part 2: Range 2 Standalone (Release 16); Mar. 2021; consisting of 180 pages.

3GPP TS 38.101-3 V16.7.0; 3rd Generation Partnership Project; Technical Specification Group Radio Access Network; NR; User Equipment (UE) radio transmission and reception; Part 3: Range 1 and Range 2 Interworking operation with other radios (Release 16); Mar. 2021; consisting of 531 pages.

* cited by examiner

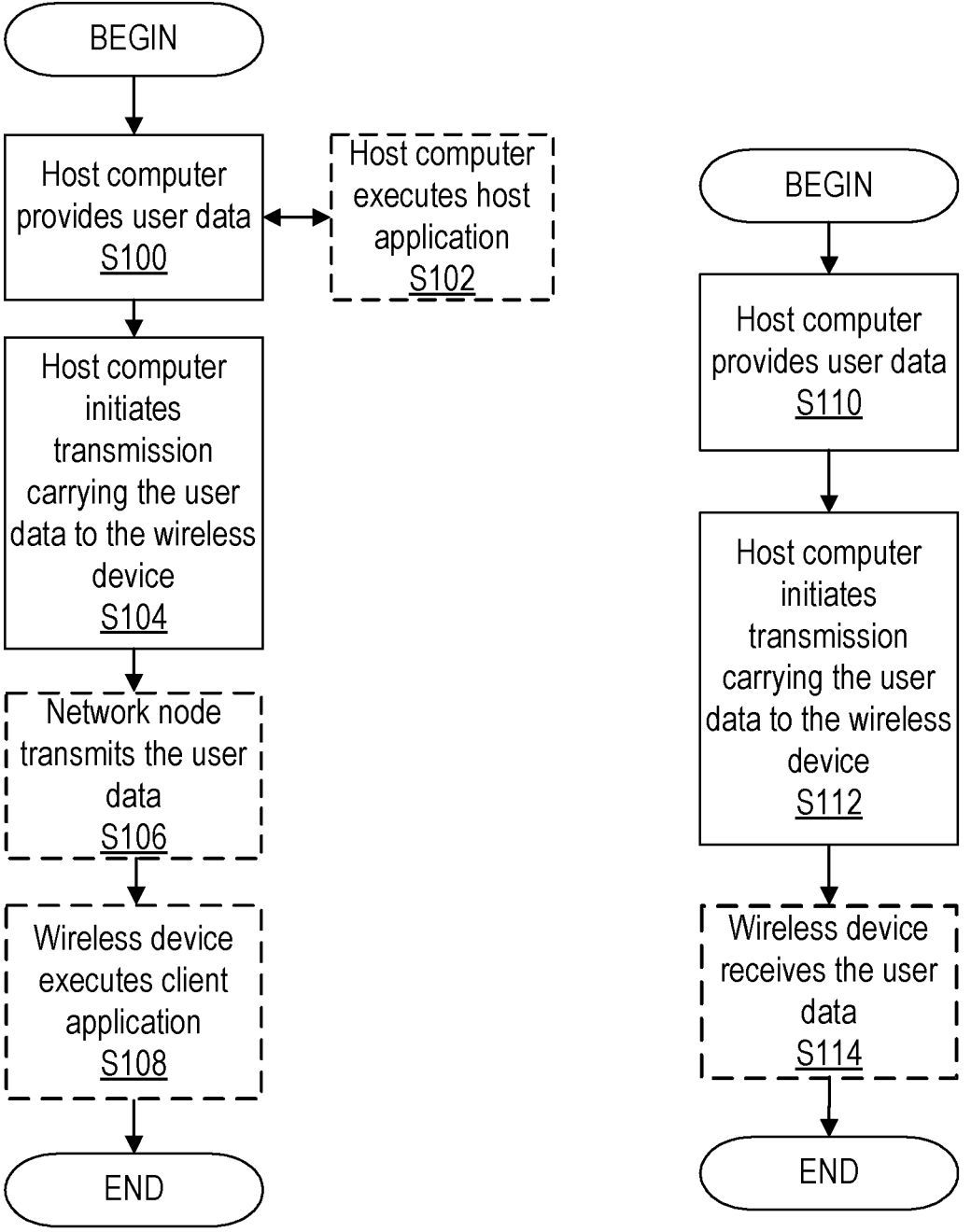
FIG. 4                 FIG. 5

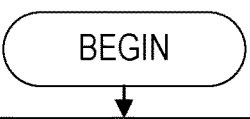

Receive a first indication indicating that the wireless device is an energy harvesting wireless device
S142

Perform at least one action associated with energy harvesting at the wireless device based at least on the first indication
S144

END

FIG. 10

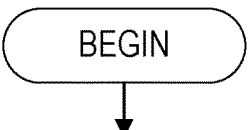

Cause a transmission to the network node of a first indication indicating that the wireless device is an energy harvesting wireless device
S146

Receive a configuration from the network node configured to cause the wireless device to perform at least one action associated with energy harvesting at the wireless device
S148

Perform the at least one action in response to receiving the configuration
S150

END

FIG. 11

SIGNALING OPTIMIZATIONS FOR WIRELESS DEVICES OPERATING ON HARVESTED ENERGY

CROSS-REFERENCE TO RELATED APPLICATIONS

This application is a Submission Under 35 U.S.C. § 371 for U.S. National Stage Patent Application of International Application No.: PCT/SE2022/050584, filed Jun. 14, 2022 entitled "SIGNALING OPTIMIZATIONS FOR WIRELESS DEVICES OPERATING ON HARVESTED ENERGY," which claims priority to U.S. Provisional Application No. 63/210,373, filed Jun. 14, 2021, entitled "SIGNALING OPTIMIZATIONS FOR UES OPERATING ON HARVESTED ENERGY," the entireties of both of which are incorporated herein by reference.

TECHNICAL FIELD

The present disclosure relates to wireless communications, and in particular, to support of an energy harvesting wireless device based on, for example, an indication from the wireless device.

BACKGROUND

The next paradigm shift in processing and manufacturing is the Industry 4.0 paradigm in which factories are automated and made more flexible and dynamic with the help of wireless connectivity. This automation and flexibility includes real-time control of robots and machines using time-critical machine-type communication (cMTC) and improved observability, control, and error detection over existing systems with the help of large numbers of low complexity actuators and sensors (massive machine-type communication or mMTC). For cMTC support, URLLC (ultra-reliable low-latency communication) was introduced in the $3^{rd}$ Generation Partnership Project (3GPP) Release 15 (Rel-15) for both LTE (Long-Term Evolution, also referred to as $4^{th}$ Generation(4G)) and NR (New Radio, also referred to as $5^{th}$ Generation (5G)), and NR URLLC is further enhanced in 3GPP Release 16 within the enhanced URLLC (eURLLC) and Industrial IoT work items.

For mMTC and low power wide area (LPWA) support, 3GPP introduced both Narrowband Internet-of-Things (NB-IOT) and Long-Term Evolution for Machine-Type Communications (LTE-MTC, or LTE-M) in 3GPP Release 13. These technologies have been further enhanced through all releases up until and including the ongoing 3GPP Release 17.

NR was introduced in 3GPP Release 15 and focused mainly on the enhanced mobile broadband (eMBB) and cMTC. However, there are still several other use cases whose requirements are higher than those of LPWA networks (i.e., LTE-M/NB-IoT) but lower than those of URLLC and eMBB. In order to help efficiently support such use cases which are in-between eMBB, URLLC, and mMTC, 3GPP has studied reduced capability NR devices (RedCap) in 3GPP Release 17. A RedCap work item is currently being discussed.

The RedCap wireless devices (e.g., user equipments (UEs)) are required to have lower cost, lower complexity, a longer battery life and potentially a smaller form factor than legacy NR wireless devices. Therefore, in 3GPP Rel-17, different complexity reduction features, such as reduced maximum wireless device bandwidth, reduced minimum number of receiver branches, reduced maximum number of downlink (DL) Multiple-Input Multiple Output (MIMO) layers, relaxed downlink modulation order, and support of half-duplex FDD operation will be specified for RedCap wireless devices.

The discussion on potential enhancements for RedCap in 3GPP Rel-18 is expected to begin in 3GPP. One of the potential enhancements is related to the support of RedCap wireless devices operating on harvested energy. The energy harvesting wireless devices are getting more attention as they can be self-sufficient, "green" and environmentally friendly, and ideally able to perpetually perform operations. The source of the harvested energy may be, for example, any one of vibration, radio waves, indoor office light, etc. A typical characteristic of energy harvesting wireless devices is that the amount of energy that is available to communicate with the network node/network often varies drastically over time and is a stochastic process.

In general, the harvested energy cannot be used directly by the wireless device, but the wireless device may need to accumulate enough energy to perform an operation, e.g., a wireless transmission. Therefore, energy harvesting wireless devices need rechargeable batteries or capacitors that can make the storage and management of the energy possible.

The capability of the energy harvesting wireless devices may vary depending on several factors, such as the energy harvesting technology, the environment where the wireless device is deployed in, the maximum amount of stored energy, the needed charging time and the form-factor of the wireless device, the signal strength in case of radio frequency (RF) harvesting, the efficiency of the harvester, the sensitivity of the harvester (i.e., the minimum power required to harvest energy), etc. Based on these considerations, modification of existing open systems interconnection (OSI) layer 2 (L2)/layer 3 (L3) protocols/signaling may be needed to properly support such wireless device in 5G and beyond networks.

In particular, the 3GPP Rel-15/16 wireless device may provide various assistance information to the network in radio resource control (RRC)_CONNECTED, if it is capable and if it is configured to do so. One purpose of the wireless device (UE) assistance information (UAI) has been described in the NR specification 3GPP Technical Specification (TS) 38.331. A portion of the 3GPP 38.331 specification is described below.

FIG. 1 is an example of a signaling diagram for wireless device assistance information according to 3GPP TS 38.331. One purpose of this procedure is for the wireless device to inform the network/network node of:

- its delay budget report carrying desired increment/decrement in the connected mode (i.e., RRC connected mode) discontinuous reception (DRX) cycle length, or;
- its overheating assistance information, or;
- its IDC (e.g., in-device coexistence) assistance information, or;
- its preference on DRX parameters for power saving, or;
- its preference on the maximum aggregated bandwidth for power saving, or;
- its preference on the maximum number of secondary component carriers for power saving, or;
- its preference on the maximum number of MIMO layers for power saving, or;
- its preference on the minimum scheduling offset for cross-slot scheduling for power saving, or;
- its preference on the RRC state, or;
- configured grant assistance information for NR sidelink communication, or;

its preference in being provisioned with reference time information.

The description of UAI is also available in NR specification 3GPP TS 38.300 and/or 3GPP TS 36.311, v16.4.1, a portion of which is described below.

Wireless Device (e.g., UE) Assistance Information (UAI)

When configured to do so, the wireless device can signal the network (e.g., network node) through UEAssistanceInformation:

If it (i.e., the wireless device) prefers an adjustment in the connected mode DRX cycle length, for the purpose of delay budget reporting;

If it is experiencing internal overheating;

If it prefers certain DRX parameter values, and/or a reduced maximum number of secondary component carriers, and/or a reduced maximum aggregated bandwidth and/or a reduced maximum number of MIMO layers and/or minimum scheduling offsets K0 and K2 for power saving purpose;

If it expects not to send or receive any more data in the near future, and in this case, it can provide its preference to transition out of RRC_CONNECTED where this indication may express its preferred RRC state, or alternately, it may cancel an earlier indicated preference to transition out of RRC_CONNECTED;

If it prefers (not) to be provisioned with reference time information;

The list of frequencies affected by IDC problems are described in clause 23.4 of 3GPP TS 36.300 v16.5.0).

Only the Frequency Division Multiplexing (FDM) solution as defined for E-UTRA in clause 23.4 of 3GPP TS 36.300 v16.5.0 is used in NR. The requirements on RRM/RLM/CSI measurements in different phases of IDC interference defined in 3GPP TS 36.300 v16.5.0 are applicable except that for NR serving cell, the requirements in 3GPP TS 38.133 and 3GPP TS 38.101-1, 3GPP TS 38.101-2, 3GPP TS 38.101-3 apply.

In the second case, the wireless device can express a preference for temporarily reducing the number of maximum secondary component carriers, the maximum aggregated bandwidth and the number of maximum MIMO layers. In all cases, it is up to the network node (e.g., gNB) whether to accommodate the request.

For sidelink, the wireless device can report SL traffic pattern(s) to NG-RAN, for periodic traffic.

Thus far, all the existing transmission and reception protocols/techniques consider and/or assume the wireless device always has sufficient energy for transmission and reception. However, for the energy harvesting wireless devices it might happen that the energy source (battery or capacitor) is currently depleted and there is no energy for transmission or reception.

SUMMARY

Some embodiments advantageously provide methods, systems, and apparatuses for support of an energy harvesting wireless device based on, for example, an indication from the wireless device.

In one or more embodiments, the network node is configured to optimize its communication (i.e., transmission and/or reception) with one or more wireless devices operating on harvested energy. A non-limiting example of such energy harvesting wireless devices includes RedCap wireless devices and their enhanced version (e.g., known as eRedCap). More specifically, in one or more embodiments, the set of existing UAI parameters are extended and/or modified, as described herein, to enable a RedCap wireless device to inform the network node of specific information related to its available energy level and energy harvesting-reliant operation. Furthermore, in one or more embodiments, an indication of specific energy harvesting capabilities of the wireless device is provided via radio access capability signaling and/or during random access procedure, for example.

According to another aspect of the present disclosure, a network node configured to communicate with a wireless device is provided. The network node includes processing circuitry configured to receive a first indication indicating that the wireless device is an energy harvesting wireless device, and to perform at least one action associated with energy harvesting at the wireless device based at least on the first indication.

According to another aspect of the present disclosure, a method implemented in a network node in communication with a wireless device is provided. A first indication is received indicating that the wireless device is an energy harvesting wireless device, and at least one action which is associated with energy harvesting at the wireless device is performed based at least on the first indication.

According to another aspect of the present disclosure, a wireless device configured to communicate with a network node is provided. The wireless device includes processing circuitry configured to cause a transmission to the network node of a first indication indicating that the wireless device is an energy harvesting wireless device, receive a configuration from the network node configured to cause the wireless device to perform at least one action associated with energy harvesting at the wireless device, and perform the at least one action in response to receiving the configuration.

According to another aspect of the present disclosure, a method implemented in a wireless device in communication with a network node is provided. A first indication indicating that the wireless device is an energy harvesting wireless device is transmitted to the network node, a configuration is received from the network node configured to cause the wireless device to perform at least one action associated with energy harvesting at the wireless device, and at least one action is performed in response to receiving the configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating example methods implemented in a communication system including a host computer, a network node and a wireless device for executing a client application at a wireless device according to some embodiments of the present disclosure;

FIG. 5 is a flowchart illustrating example methods implemented in a communication system including a host computer, a network node and a wireless device for receiving user data at a wireless device according to some embodiments of the present disclosure;

FIG. 10 is a flowchart of another example process in a network node according to some embodiments of the present disclosure; and FIG. 11 is a flowchart of another example process in a wireless device according to some embodiments of the present disclosure.

DETAILED DESCRIPTION

Figure 1:
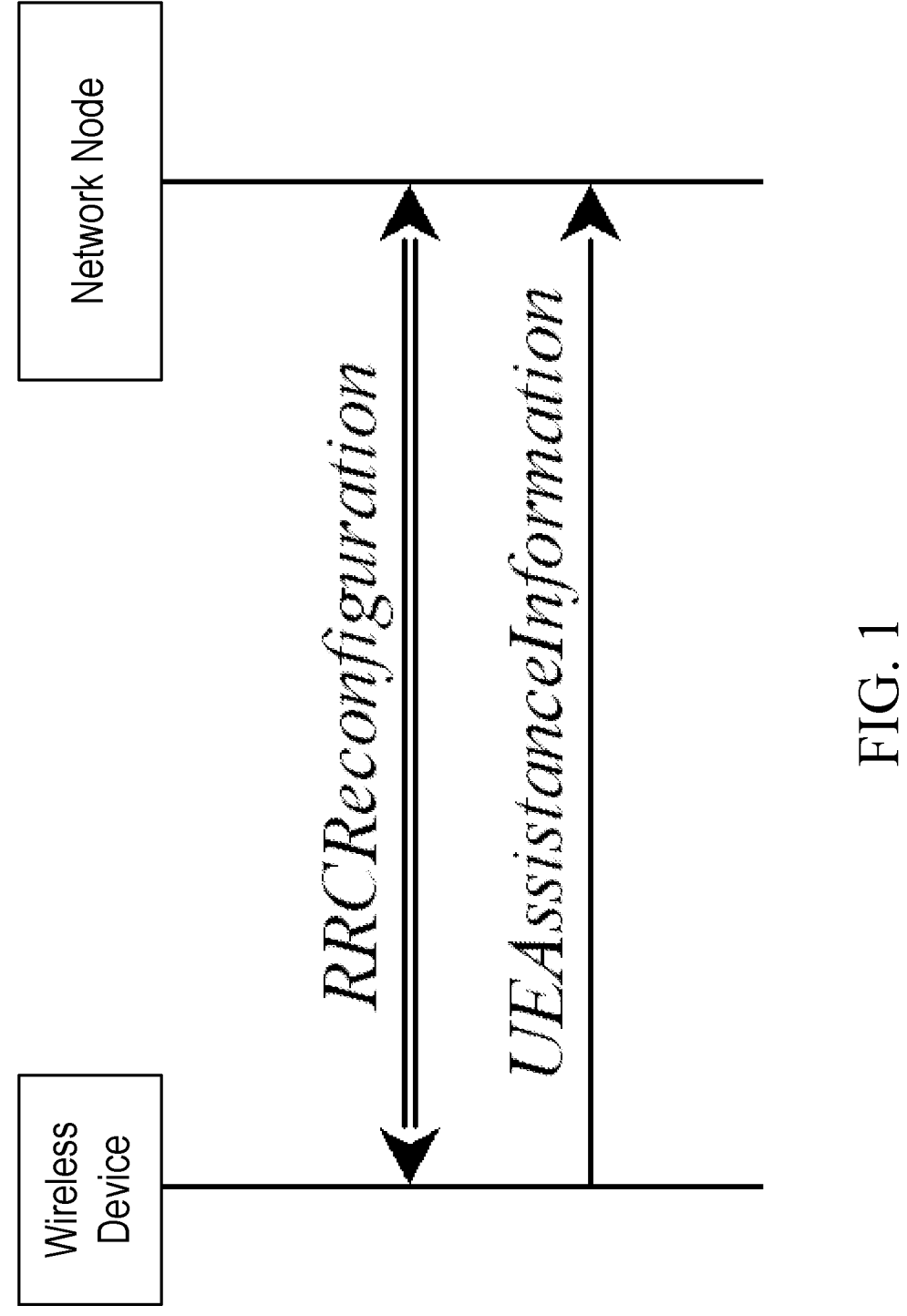
FIG. 1 is a signaling diagram of wireless device assistance information.

As described above, all the existing transmission and reception protocols/techniques consider and/or assume the wireless device always has sufficient energy for transmission and reception. However, for the energy harvesting wireless devices it might happen that the energy source (battery or capacitor) for the wireless device is currently depleted and there is no energy for transmission or reception. That is, currently, there is no UAI that can efficiently support energy harvesting wireless devices. Furthermore, the current radio access capability signaling lacks parameters that are relevant for proper handling of energy harvesting wireless devices. If the wireless device can provide useful information related to its energy level to the network node, the communication can be adapted based on this information.

One or more embodiments described herein enable the network node to properly handle (i.e., take into consideration) wireless devices (such as RedCap, eRedCap) operating on harvested energy. RedCap is used herein as a non-limiting example of wireless devices with energy harvesting capabilities, but the teachings described herein are equally applicable to any wireless device with energy harvesting capabilities.

Before describing in detail example embodiments, it is noted that the embodiments reside primarily in combinations of apparatus components and processing steps related to support of an energy harvesting wireless device based on, for example, an indication from the wireless device. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IOT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

As used in one or more embodiments, informing a network node of a wireless device's "preference" may refer to an explicit or implicit request by the wireless device for implementation of a configuration.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide support of an energy harvesting wireless device (i.e., one or more wireless devices) based on, for example, an indication from the wireless device (i.e., one or more wireless devices).

Figure 2:
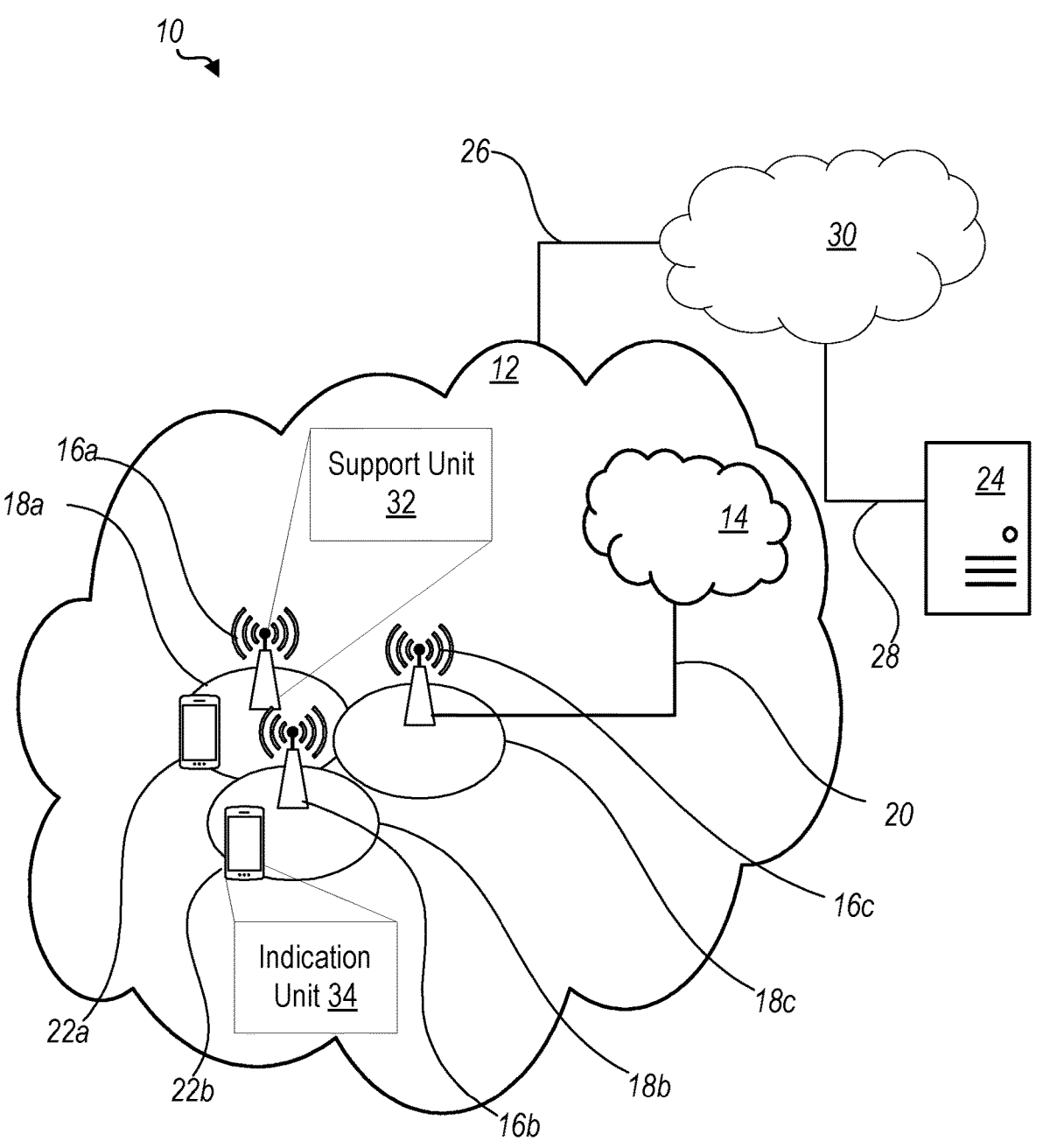
FIG. 2 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a support unit 32 which is configured to perform one or more network node 16 functions described herein such as with respect to support of an energy harvesting wireless device based on, for example, an indication from the wireless device. A wireless device 22 is configured to include an indication unit 34 which is configured to perform one or more wireless device 22 functions as described herein, such as with respect to an indication associated with energy harvesting.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to analyze, process, forward, relay, transmit, receive, store, etc., information related to support of an energy harvesting wireless device based on, for example, an indication from the wireless device.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an support unit 32 configured to perform one or more network node 16 functions as described herein such as with respect to support of an energy harvesting wireless device based on, for example, an indication from the wireless device.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an indication unit 34 configured to perform one or more wireless device 22 functions as described herein such as with respect to support of an energy harvesting wireless device based on, for example, an indication from the wireless device.

Figure 3:
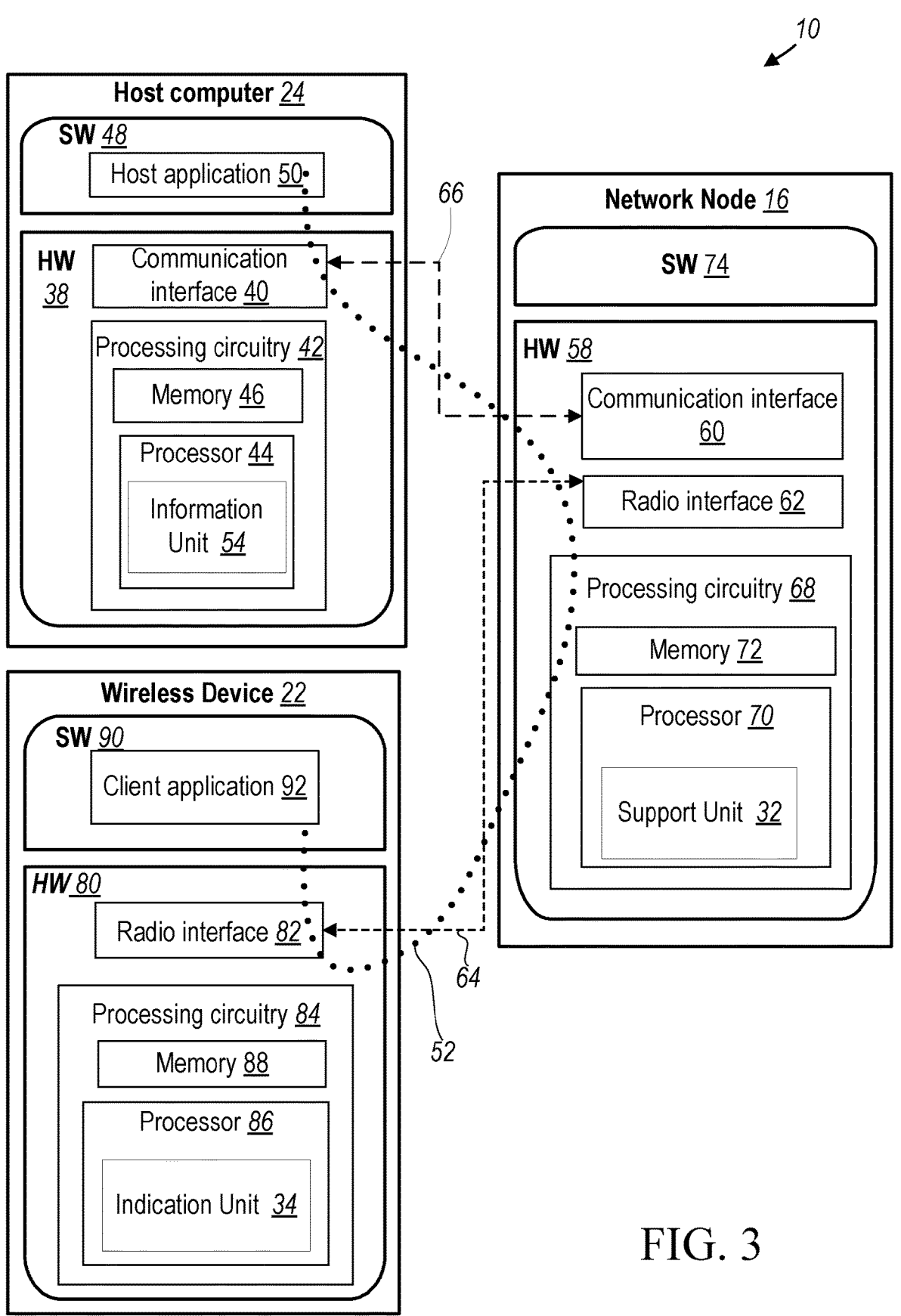
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as support unit 32, and indication unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
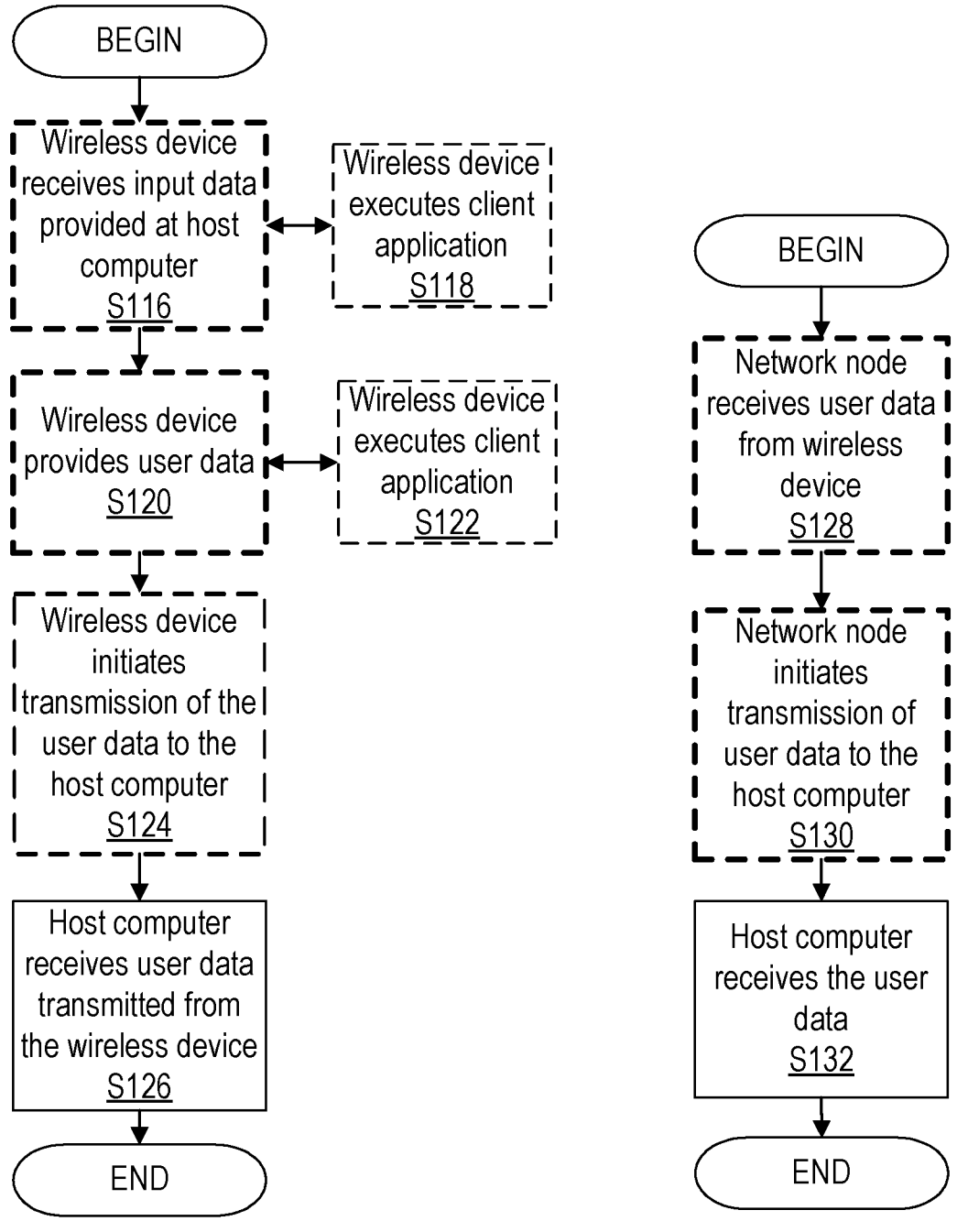
FIG. 6 is a flowchart illustrating example methods implemented in a communication system including a host computer, a network node and a wireless device for receiving user data from the wireless device at a host computer according to some embodiments of the present disclosure.
FIG. 7 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figures 8, 9:
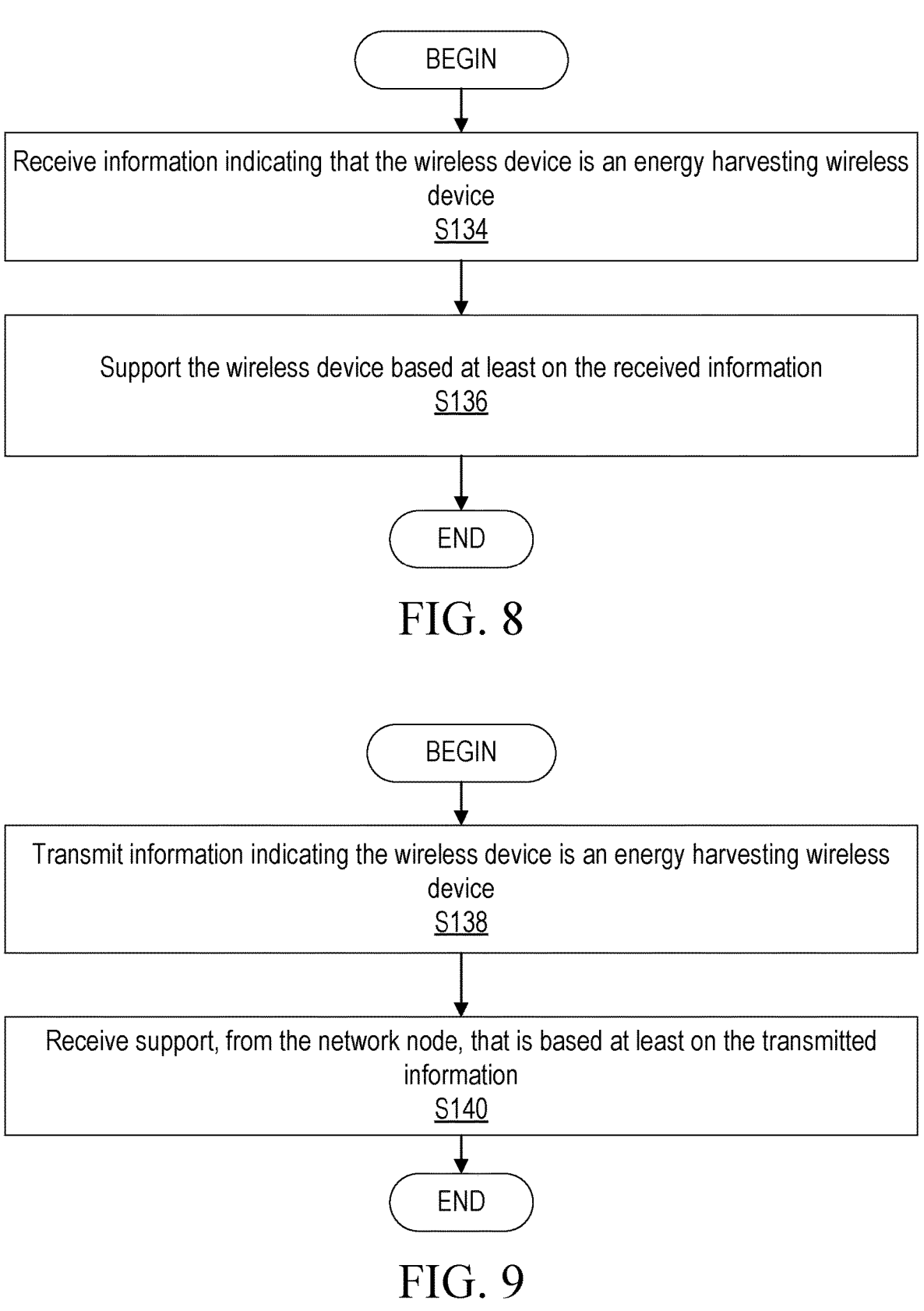
FIG. 8 is a flowchart of an example process in a network node according to some embodiments of the present disclosure.
FIG. 9 is a flowchart of an example process in a wireless device according to some embodiments of the present disclosure.

FIG. 8 is a flowchart of an example process in a network node 16 according to some embodiments of the present disclosure. One or more blocks described herein may be performed by one or more elements of network node 16 such as by one or more of processing circuitry 68 (including the support unit 32), processor 70, radio interface 62 and/or communication interface 60. Network node 16 is configured to receive (Block S134) information indicating that the wireless device 22 is an energy harvesting wireless device, as described herein. Network node 16 is configured to support (Block S136) the wireless device based at least on the received information, as described herein.

According to one or more embodiments, the support of the wireless device 22 includes at least one of: configuring the wireless device 22 based on the received information; providing energy harvesting signal power to the wireless device 22 before receiving a mobile terminated connection based at least on the received information; providing energy harvesting signal power to the wireless device 22 before attempted to initiate a connection with the wireless device 22 based at least on the received information; configuring the wireless device 22 to use a plurality of energy harvesting sources based at least on the received information; and scheduling the wireless device 22 based at least on the received information. For example, the configuration may be a modified configuration that is modified based on the received information. In another example, the wireless device 22 is configured with a configuration based on the received information without requiring a configuration to be modified. According to one or more embodiments, the received information includes at least one of: an energy harvesting profile of the wireless device 22; an energy harvesting type of the wireless device 22; a wireless device communication preference; antenna panel information; wireless device capability for wake-up signaling; wireless device processing time capability; and an indication associated with release assistance information.

According to one or more embodiments, the wireless device communication preference includes at least one of: a preference to temporarily suspend at least one of transmission and reception for a predefined duration of time while in a radio resource control_CONNECTED state; a preference to be configured with a configured grant; a preference to reduce uplink transmit power for one of an uplink shared channel and uplink control channel; a preference to be configured with open-loop power control; a preference to use half-duplex frequency division duplex, FDD, mode; a preference to stop monitoring a downlink control channel in at least one transmission configuration indicator, TCI, state; and a preference for a downlink control channel aggregation level, AL.

According to one or more embodiments, the received information corresponds to extended user equipment, UE, assistance information, UAI. According to one or more embodiments, the received information is received as part of a random access message. According to one or more embodiments, the random access message is one of message 1 and message 3 of a random access procedure.

FIG. 9 is a flowchart of an example process in a wireless device 22 according to some embodiments of the present disclosure. One or more blocks described herein may be performed by one or more elements of wireless device 22 such as by one or more of processing circuitry 84 (including the indication unit 34), processor 86, radio interface 82 and/or communication interface 60. Wireless device 22 is configured to transmit (Block S138) information indicating the wireless device 22 is an energy harvesting wireless device, as described herein. Wireless device 22 is configured to receive (Block S140) support, from the network node 16, that is based at least on the transmitted information (i.e., the information received by the network node 16 at Block S134 and/or transmitted by the wireless device at Block S138), as described herein.

According to one or more embodiments, the support includes at least one of: a configuration for the wireless device based at least on the transmitted information (i.e., the information received by the network node 16 at Block S134 and/or transmitted by the wireless device at Block S138), receiving energy harvesting signal power before transmitting a mobile terminated connection, receiving energy harvesting signal power before the network node attempts to initiate a connection with the wireless device, a configuration for the wireless device to use a plurality of energy harvesting sources based at least on the transmitted information, and a scheduling that is based at least on the transmitted information. For example, the configuration may be a modified configuration that is modified based on the transmitted information. In another example, the wireless device 22 is configured with a configuration based on the transmitted information without requiring a configuration to be modified.

According to one or more embodiments, the transmitted information includes at least one of: an energy harvesting profile of the wireless device 22; an energy harvesting type; a wireless device communication preference; antenna panel information; wireless device capability for wake-up signaling; wireless device processing time capability; and an indication associated with release assistance information. According to one or more embodiments, the wireless device communication preference includes at least one of: a preference to temporarily suspend at least one of transmission and reception for a predefined duration of time while in a radio resource control_CONNECTED state; a preference to be configured with a configured grant; a preference to reduce uplink transmit power for one of an uplink shared channel and uplink control channel; a preference to be configured with open-loop power control; a preference to use half-duplex frequency division duplex, FDD, mode; a preference to stop monitoring a downlink control channel in at least one transmission configuration indicator, TCI, state; and a preference for a downlink control channel aggregation level, AL. According to one or more embodiments, the transmitted information corresponds to extended user equipment, UE, assistance information, UAI. According to one or more embodiments, the transmitted information is received as part of a random access message. According to one or more embodiments, the random access message is one of message 1 and message 3 of a random access procedure.

FIG. 10 is a flowchart of another example process in a network node 16 according to some embodiments of the present disclosure. One or more blocks described herein may be performed by one or more elements of network node 16 such as by one or more of processing circuitry 68 (including the support unit 32), processor 70, radio interface 62 and/or communication interface 60. Network node 16 is configured to receive (Block S142) a first indication indicating that the wireless device is an energy harvesting wireless device, as described herein. Network node 16 is configured to perform (Block S144) at least one action associated with energy harvesting at the wireless device based at least on the first indication, as described herein.

According to one or more embodiments, the first indication includes an energy harvesting profile of the wireless device 22, where the energy harvesting profile indicates at least one of an energy harvesting source type of the wireless device 22, an energy harvesting rate of the wireless device 22, an energy harvesting time interval of the wireless device 22, an energy harvesting periodicity of the wireless device 22, an energy harvesting time duration of the wireless device 22, and an energy depletion time duration of the wireless device 22. According to one or more embodiments, the first indication includes a request of the wireless device 22 to suspend one of a transmission, reception, and measurement while the wireless device 22 is in a radio resource control, RRC, connected state, where the performing of the at least one action includes, at a first time, suspending the one of the transmission, reception, and measurement with the wireless device 22 without releasing the wireless device 22 to either of an idle state or an inactive state, and resuming the one of the transmission, reception, and measurement after a predefined duration of time has elapsed from the first time.

According to one or more embodiments, the first indication includes a mapping of energy harvesting profiles to requested radio resource control, RRC, parameter sets, and the processing circuitry 68 is further configured to: receive a second indication from the wireless device 22 indicating a current energy harvesting profile of the wireless device 22, and where the performing of the at least one action includes modifying an RRC parameter set of the wireless device 22 to one of the requested RRC parameter sets based on the mapping and the second indication. According to one or more embodiments, the first indication includes a request of the wireless device 22 to be configured with a configured grant in one of a radio resource control, RRC, connected, and RRC inactive state, the first indication further includes a minimum time gap to the configured grant, and where the performing of the at least one action includes receiving an uplink data transmission from the wireless device 22 based on the configured grant. According to one or more embodiments, the first indication includes a request of the wireless device 22 to reduce uplink transmit power, and the performing of the at least one action includes: determining one of a target received power, TPC, command, a target data rate, and a maximum output power based on the request to reduce uplink transmit power, causing a transmission to the wireless device 22 of the TPC command, target data rate, or maximum output power, and receiving an uplink data transmission from the wireless device 22 based on the TPC command, target data rate, or maximum output power.

According to one or more embodiments, the first indication includes a request of the wireless device 22 to change antenna panel activity when a power level of the wireless device 22 falls below a first threshold, and the performing of the at least one action includes configuring the wireless device 22 with a first multiple input multiple output, MIMO, configuration associated with a first number of layers, receiving a second indication from the wireless device 22 indicating that a power level of the wireless device 22 has fallen below the first threshold, based on the second indication, determining a second MIMO configuration associated with a second number of layers fewer than the first number of layers, and configuring the wireless device 22 with the second MIMO configuration. According to one or more embodiments, the first indication includes a request of the wireless device 22 to use a maximum number of transmission configuration indication, TCI, states to monitor a physical downlink control channel, PDCCH, and the performing of the at least one action includes causing a transmission of the signaling on the PDCCH to the wireless device 22 based on the maximum number of TCI states.

According to one or more embodiments, the first indication includes a first processing time capability of the wireless device 22, a second processing time capability of the wireless device 22 slower than the first processing time capability, and a time gap, and the performing of the at least one action includes, at a first time, communicating with the wireless device 22 according to the first processing time capability, and communicating with the wireless device 22 according to the second processing time capability after the time gap has elapsed from the first time. According to one or more embodiments, the processing circuitry 68 is further configured to receive a first release information from the wireless device 22 and a second release information from at least one non-energy-harvesting wireless device 22, and the performing of the at least one action includes determining an urgency of release based on the energy harvesting profile of the wireless device 22, the first release information, and the second release information, and releasing the wireless device 22 from a radio resource control, RRC, connected state based on the urgency of release, where the wireless device 22 is released prior to the at least one non-energy-harvesting wireless device 22 being released. According to one or more embodiments, the processing circuitry 68 is further configured to, at a first time, receive an indication of a time duration associated with a remaining energy level of the wireless device 22, where performing the at least one action includes releasing the wireless device 22 from a radio resource control, RRC, connected state after the time duration has elapsed from the first time.

According to one or more embodiments, the first indication is provided in a user equipment, UE, assistance information, UAI. According to one or more embodiments, the first indication is provided in a random access message. According to one or more embodiments, the first indication is provided via radio access capability signaling. According to one or more embodiments, the first indication is received based on a power level of the wireless device 22 falling below a first threshold. According to one or more embodiments, the first indication includes a request of the wireless device 22 to harvest radio frequency, RF, energy, where the first indication indicates a periodicity for RF energy harvesting, and where the performing of the at least one action includes determining a schedule for transmitting RF energy to the wireless device 22 based on the periodicity, and causing transmission of the RF energy to the wireless device 22 based on the schedule. According to one or more embodiments, the first indication includes a request of the wireless device 22 to harvest radio frequency, RF, energy, prior to initiating a mobile terminated connection, and the performing of the at least one action includes causing transmission of the RF energy to the wireless device 22 during for a period of time based on the indicated time duration, and, subsequent to the period of time, initiating the mobile terminated connection to the wireless device 22.

FIG. 11 is a flowchart of another example process in a wireless device 22 according to some embodiments of the present disclosure. One or more blocks described herein may be performed by one or more elements of wireless device 22 such as by one or more of processing circuitry 84 (including the indication unit 34), processor 86, radio interface 82 and/or communication interface 60. Wireless device 22 is configured to cause a transmission (Block S146) to the network node of a first indication indicating that the wireless device is an energy harvesting wireless device, as described herein. Wireless device 22 is configured to receive (Block S148) a configuration from the network node configured to cause the wireless device to perform at least one action associated with energy harvesting at the wireless device, as described herein. Wireless device 22 is configured to perform (Block S150) at least one action in response to receiving the configuration, as described herein.

According to one or more embodiments, the first indication includes an energy harvesting profile of the wireless device 22, where the energy harvesting profile indicates at least one of: an energy harvesting source type of the wireless device 22, an energy harvesting rate of the wireless device 22, an energy harvesting time interval of the wireless device 22, an energy harvesting periodicity of the wireless device 22, an energy harvesting time duration of the wireless device 22, and an energy depletion time duration of the wireless device 22. According to one or more embodiments, the first indication includes a mapping of energy harvesting profiles to requested radio resource control, RRC, parameter sets, where the processing circuitry 84 is further configured to cause transmission of a second indication to the network node 16 indicating a current energy harvesting profile of the wireless device 22, and the performing of the at least one action includes modifying an RRC parameter set of the wireless device 22 to one of the requested RRC parameter sets based on the mapping and the second indication.

According to one or more embodiments, the first indication includes a request of the wireless device 22 to be configured with a configured grant in one of a radio resource control, RRC, connected, and RRC inactive state, the first indication further includes a minimum time gap to the configured grant, the configuration includes at least one configured grant based on the request and the minimum time gap, and the performing of the at least one action includes causing transmission of an uplink data transmission from the wireless device 22 based on the at least one configured grant. According to one or more embodiments, the first indication includes a request to reduce uplink transmit power, and the configuration includes one of a target received power, TPC, command, a target data rate, and a maximum output power, and the performing of the at least one action includes causing transmission of an uplink data transmission from the wireless device 22 based on the one of the TPC command, target data rate, and maximum output power.

According to one or more embodiments, the first indication includes a request of the wireless device 22 to change antenna panel activity when a power level of the wireless device 22 falls below a first threshold, and the performing of the at least one action includes determining a first multiple input multiple output, MIMO, configuration associated with a first number of layers, determining that the power level of the wireless device 22 has fallen below the first threshold, causing transmission of a second indication to the network node 16 indicating that the power level of the wireless device 22 has fallen below the first threshold, receiving, based on the second indication, a second MIMO configuration associated with a second number of layers fewer than the first number of layers, and causing a transmission to the network node 16 based on the second MIMO configuration.

According to one or more embodiments, the first indication includes a request of the wireless device 22 to use a maximum number of transmission configuration indication, TCI, states to monitor a physical downlink control channel, PDCCH, and the performing of the at least one action includes receiving the PDCCH signaling from the network node 16 based on the maximum number of TCI states.

According to one or more embodiments, the first indication includes a first processing time capability of the wireless device 22, a second processing time capability of the wireless device 22 slower than the first processing time capability, and a time gap, and the performing of the at least one action includes, at a first time, communicating with the network node 16 according to the first processing time capability, and communicating with the network node 16 according to the second processing time capability after the time gap has elapsed from the first time.

According to one or more embodiments, the performing of the at least one action includes determining a first release information indicating a time duration associated with a remaining energy level of the wireless device 22, at a first time, causing transmission of the first release information to the network node 16, and, after the time duration has elapsed from the first time, receiving a release response from the network node 16, where the release response is associated with the first release information and releasing the wireless device 22 from a radio resource control, RRC, connected state. According to one or more embodiments, the first indication is provided in a user equipment, UE, assistance information, UAI. According to one or more embodiments, the first indication is provided in a random access message. According to one or more embodiments, the first indication is provided via radio access capability signaling. According to one or more embodiments, the first indication is transmitted based on a power level of the wireless device 22 falling below a first threshold.

According to one or more embodiments, the first indication includes a request of the wireless device 22 to harvest radio frequency, RF, energy, where the first indication indicates a periodicity for RF energy harvesting, and the performing of the at least one action includes determining a schedule for receiving RF energy from the network node 16 based on the periodicity, and receiving the RF energy from the network node 16 based on the schedule. According to one or more embodiments, the first indication includes a request of the wireless device 22 to harvest radio frequency, RF, energy, prior to initiating a mobile terminated connection, and the performing of the at least one action includes determining an energy harvesting time duration based on the energy harvesting profile of the wireless device 22, receiving the RF energy from the network node 16 during the energy harvesting time duration, and, subsequent to the energy harvesting time duration, initiating the mobile terminated connection with the network node 16.

Having generally described arrangements for support of an energy harvesting wireless device 22 based on, for example, an indication from the wireless device 22, functions and processes are provided as follows, and which may be implemented by the network node 16, wireless device 22 and/or host computer 24.

Some embodiments provide support of an energy harvesting wireless device based on, for example, an indication from the wireless device. One or more network node 16 functions described below may be performed by one or more of processing circuitry 68, processor 70, support unit 32, radio interface 62, etc. One or more wireless device 22 functions described below may be performed by one or more of processing circuitry 84, processor 86, indication unit 34, radio interface 82, etc.

In a first embodiment, the set of wireless device (e.g., UE) assistance parameters are extended to enable the (RedCap) wireless device 22 to inform the network node 16 of one or more of the following:

1) The wireless device 22's preference to temporarily suspend transmission/reception (including performing measurements) for a certain duration of time in RRC_CONNECTED. If network node 16 configures wireless device 22 according to wireless device 22's preference, wireless device 22 may be able to continue being in RRC_CONNECTED, without being released to RRC_IDLE/RRC_INACTIVE (and without having to perform any transmission/reception, e.g., monitoring PDCCH) for the configured duration of time. Wireless device 22 can use this time during the temporarily suspended transmission and/or reception to harvest enough energy so that wireless device 22 can complete the transmission/reception of data in RRC_CONNECTED. Since wireless device 22 is not released to RRC_IDLE/RRC_INACTIVE, wireless device 22 does not have to initiate RRC connection setup or resume procedure to come back or re-enter to RRC_CONNECTED to complete the data transfer (but possibly to re-obtain UL synchronization), thus helping avoid wasting wireless device 22's harvested energy with signaling and state transitions that may require higher energy consumption, e.g., for entering and exiting deep sleep in RRC-IDLE and/or RRC_INACTIVE. Wireless device 22's preference on the suspension period/duration can be in units of milliseconds, frames, sub-frames, or slots, for example. The assistance information could also include a minimum time offset to indicate the preferred starting time instant of the suspension period.

In one or more embodiments, the time offset may be dependent on the stochastic nature of the energy harvesting. In a related embodiment, multiple time offset values are preconfigured for wireless device 22 by network node 16, and wireless device 22 indicates its preference for one of the preconfigured time offset values to use based at least one, for example, one or more of the scenario, environment, and wireless device 22 activity time.

2) Wireless device 22's preference to be configured with configured grant (CG) feature (Type 1 or Type 2) in RRC_CONNECTED, or CG-SDT in RRC_INACTIVE. The assistance information could include a minimum time offset to indicate the minimum time gap to the configured grant. This time gap may reflect the time duration (e.g., estimated time duration) needed for wireless device 22 to harvest enough amount of energy to complete the data transfer. Another example of the assistance information includes a preferred period or minimum period of the configured grant for which wireless device 22 can harvest enough amount of energy to be able to complete the data transmission in each period. Alternatively, wireless device 22 can indicate its preference to be configured with 2-step random access channel (RACH) procedure, instead of the CG, or any other even more economized RACH feature.

3) Indication of information related to wireless device 22's energy profile. Based on this information, network node 16 may release wireless device 22 to RRC_IDLE/RRC_INACTIVE. This assistance information can also be useful in the event that wireless device 22 enters the energy harvesting mode, during which wireless device 22 may not be able to communicate with network node 16. This helps network node 16 to avoid unnecessary paging (and paging escalation). In one example, the energy profile includes at least one of the following harvesting profile characteristics: type of energy harvesting (e.g., RF, vibrational, solar, etc.), an indication of how much energy wireless device 22 can harvest per time unit (e.g., quantified in a certain range), harvesting time (e.g., quantified in a certain range) that wireless device 22 would need to ensure wireless device 22 has a certain amount of energy for communication, the level of remaining energy, that the level of remaining energy wireless device 22 has stored is a critical or normal level of power/energy, or any other parameters that implicitly or explicitly indicate the level of energy remaining at wireless device.

4) Wireless device 22's preference to reduce uplink transmit power for physical uplink shared channel (PUSCH)/physical uplink control channel (PUCCH)/ sounding reference signal (SRS) transmissions. Based on this information, network node 16 may adjust wireless device 22 power control parameters (e.g., target received power, TPC command, etc.) and/or target data rate (e.g., by adjusting the modulation-and-coding scheme and the number of resource blocks assigned for transmission from wireless device 22). Wireless device 22 can also indicate its preference to reduce wireless device 22's configured maximum output power. In an extended version of this UAI, wireless device 22 can additionally indicate its preference for a specific configuration of these parameters, e.g., the number of SRS resources.

5) Wireless device 22's preference to be configured with open-loop power control, instead of closed-loop power control in RRC_CONNECTED. The closed-loop power control is useful when wireless device 22 is only able to carry out intermittent transmissions due to the variation in the amount of the harvested energy, and when there is large offset between the scheduling downlink control information (DCI) and the corresponding uplink transmission.

6) Wireless device 22's preference in being configured with or scheduled in the half-duplex FDD mode (although wireless device 22 is capable of full-duplex FDD operation). Since wireless device 22 does not have to transmit and receive simultaneously when operating in the half-duplex FDD mode, this configuration may help wireless device 22 to save power.

7) The information may include a preferred antenna panel or a change in antenna panels activity, e.g., as in frequency range 2 (FR2). For example, wireless device 22 may be equipped with two panels, and wireless device 22 indicates to network node 16 that it prefers to turn OFF the first panel and keep the second panel ON, or vice versa. In the same way, wireless device 22 may be configured to be able to reduce the number of MIMO layers based at least on a condition within the same bandwidth part (BWP). For example, wireless device 22 energy level may go below a specific threshold, and thus wireless device 22 is allowed to indicate to network node 16 that from now on, the number of MIMO layers is reduced from 4 to 1, for example. Alternatively, the configured threshold can be per reducing stage, e.g., a first threshold to go from 4 to 3 layers, and a second threshold for 3 to 2, and so on.

8) The information may include wireless device 22 preference to stop monitoring PDCCH in one or more transmission configuration indicator (TCI) states. In a related realization, wireless device 22 may indicate that it prefers to use a maximum number of TCI states to monitor PDCCH, or to receive or transmit PDSCH, PUCCH/PUSCH.

9) The information may include wireless device 22's preference/capability to be configured with a low energy consuming feature, e.g., one or more specific wake-up signaling mechanism. For example, wireless device 22 may indicate the capability to support a first wakeup signal (WUS) mechanism, and a second WUS mechanism, and further indicates its preference for the second WUS mechanism, where the second WUS mechanism consumes less power than the first WUS mechanism. For example, wireless device 22 may support both PDCCH based WUS, and (almost) zero power WUS such as on-off-keying (OOK), and further wireless device 22's preference for the zero power WUS. The preference may also additionally include the preferred configuration parameters for at least one of the WUS mechanisms, e.g., a preferred BW, CORE-SET, Search Space, duty cycle, etc.

10) Information related to wireless device 22's preferred or required PDCCH aggregation level (AL). This is beneficial for wireless device 22 power saving.

11) Information related to wireless device 22's processing time capability. Wireless device 22 processing time can be related to PDSCH decoding time ($N_1$) or PUSCH preparation time ($N_2$). Wireless device 22 operating with energy harvesting capability may support multiple wireless device 22 processing time capabilities, e.g., normal and slow values, and wireless device 22 can indicate as a wireless device assistance parameter its processing time capability to be applied after some time gap. The time gap after which the indicated processing time capability applies can be part of the wireless device indication or fixed in the specification.

12) An indication in or associated to a release assistance information (RAI), which is referred to in 3GPP TS 38.331 as releasePreference-r16, that the reason that wireless device 22 prefers to leave RRC_CON-NECTED is that wireless device 22 is an energy harvesting wireless device 22. Network node 16 may consider a release assistance information which is having this indication as more urgent than a release assistance information without it and may therefore more urgently release wireless device 22 in response to receiving such an indication.

12a) Wireless device 22 may further indicate how much longer wireless device 22 is expected to be able to maintain the connection with network node 16 in RRC_CONNECTED mode, based at least on the remaining energy of wireless device 22. This may be indicated by a time T sent together with the release assistance information.

12b) If network node 16 does not release wireless device 22 in response to wireless device 22 sending this indication to network node 16, wireless device 22 may autonomously leave RRC_CONNECTED. Wireless device 22 may do so (i.e., leave RRC_CONNECTED) only after the time T has passed.

In one embodiment, wireless device 22 is configured by network node 16 with multiple sets of RRC parameters, corresponding to different energy profile of wireless device 22. Wireless device 22 then indicates to network node 16 via UAI which set of parameters wireless device 22 prefers to use (or be switched to) based at least on its energy profile. In a related embodiment, network node 16 switches wireless device 22 (i.e., without RRC reconfiguration) to a different set of RRC parameters (among the configured sets) based at least on the energy profile reported/indicated by wireless device 22.

In one alternative of the above, certain indications can be implicit from others (i.e., grouping is applied). For example, wireless device 22 may only indicate being of 'Energy harvesting type' which means that network node 16 may assume one or more of A) wireless device 22 can become temporarily unavailable, B) that a minimum set search space and PDCCH monitoring should be configured for wireless device 22, and C) applying a certain RAI.

That wireless device 22 is of 'Energy harvesting type' can alternatively be indicated by other means, e.g., wireless device capability, as new wireless device power-classes, as an extension of the 'power preference indicator' (PPI) in LTE.

In one embodiment (related to 1) in the first embodiment), the temporarily suspended state is similar to 'power saving mode' (PSM) in LTE, or 'mobile originated communication only' (MICO) in NR, in which wireless device 22 is effectively powered down and DL reachability relies on when wireless device 22 again initiates communication.

In an alternative embodiment of 1) in the first embodiment, this temporarily suspended state could, unlike PSM and MICO, be entered directly from RRC_CONNECTED. Two example alternatives:

Either wireless device 22 is temporarily suspended from RRC_CONNECTED and hence keeps its dedicated resources, such as PUCCH, C-RNTI, etc. and network node 16 keeps wireless device 22 context (this option is better for signaling reduction), or Wireless device 22 is, explicitly or implicitly (i.e., with or without RRC signaling), released to RRC_INACTIVE or RRC_IDLE, such that connected state resources are released (this option is better if energy harvesting is expected to take a long time).

This temporarily suspended state could also be entered in RRC_INACTIVE or RRC_IDLE. For example, wireless device 22 can become energy depleted while performing Small Data Transmission (SDT) in RRC_INACTIVE.

In one embodiment, the triggering condition for wireless device 22 to enter this temporarily suspended state is based at least on explicit signaling from wireless device 22. That is, when the wireless device 22's energy storage is depleted below a certain level/threshold (possibly semi-statically configured by network node 16 and provided to wireless device 22). The indication could be in UCI, in MAC, in RRC, RAI as described above, etc.

In an alternative embodiment, the triggering condition for wireless device 22 to enter this temporarily suspended state is implicit. That is, the energy harvesting wireless device 22's energy storage can become depleted at any point. Network node 16 would detect via unresponsiveness from wireless device 22, e.g., by the lack of response to a predefined number N of PDCCH commands (i.e., scheduling wireless device 22 but not receiving any uplink transmission nor ACK/NACK on downlink transmissions).

In one embodiment, the triggering condition for wireless device 22 to exiting this temporarily suspended state is left to wireless device 22 (since network node 16 cannot know when a sufficient amount of energy has been harvested). That is, network node 16 may assume wireless device 22 to be in the temporarily suspended state until wireless device 22 initiates uplink transmission. Such uplink transmission could be random access in RRC_CONNECTED (e.g., using a dedicated preamble), RRCSetupRequest in RRC_IDLE, or RRCResumeRequest in RRC_INACTIVE.

In an alternative embodiment, the triggering condition for wireless device 22 to exiting this temporarily suspended state is a fixed period of time as in the first embodiment.

In an alternative embodiment to the above, a new RRC message or information elements are defined to signal wireless device assistance information for energy harvesting (i.e., instead of using the existing signaling). Similar information as listed above can be included in a new RRC message or procedure.

Wireless device 22 capable of providing any of the UAI (listed in the first embodiment) in RRC_CONNECTED may initiate the procedure if it was configured to do so. In one embodiment, the provision of the UAI may depend on a trigger condition, such as upon detecting that wireless device 22's energy level is smaller/lower (or larger/greater) than a configured threshold. Another triggering condition which can be applied can be network node 16 indicating to wireless device 22, e.g., through a (non-)scheduling DCI to transmit at least one of the underlying UAIs in an aperiodic manner. For example, wireless device 22 may receive a scheduling of at least a first UAI using DCI format 0-1/0-2 in RRC_CONNECTED. The provision of UAI may alternatively depend on a timer, or it may be fixed in the specification in a procedure, e.g., that an energy-harvesting wireless device 22 will always trigger sending UAI once it transitions to RRC_CONNECTED mode. Note that whether or not to configure wireless device 22 according to its preference is up to network node 16.

In one embodiment, wireless device 22 may be configured through higher layer signaling, e.g., system information (SI) broadcast, to report one or more of the described UAIs (in the first embodiment) even in RRC_IDLE/RRC_INACTIVE mode, or when wireless device 22 gets released to those any one of the states. For example, wireless device 22 may be configured to indicate to network node 16 even in RRC_IDLE/RRC_INACTIVE that its energy level is critical and needs to suspend monitoring paging. The triggering conditions mentioned in the previous embodiment above can also be applicable in RRC_IDLE/RRC_INACTIVE. A related example of the triggering condition is using a paging DCI or any other type of DCI in RRC_IDLE/RRC_INACTIVE.

In one embodiment, the RedCap wireless device 22 operating on harvested energy indicates information related to its energy profile (as described above) via MAC-CE.

In one embodiment, one or more of the following radio access capability parameters related to wireless device 22's energy harvesting capability are included in the wireless device capability signaling:

An explicit or implicit indication that wireless device 22 operates on harvested energy.

Indication of whether wireless device 22 is equipped with a battery or not, i.e., using a capacitor (instead of a battery) for energy storage. If wireless device 22 is battery-less, wireless device 22 may not sustain its transmission for a long duration of time. Therefore, network node 16 can take this capability information into account while configuring/scheduling wireless device 22.

Indication of the source of the harvested energy (e.g., vibration, thermo-electric, indoor office light, radio waves, etc.) and/or energy harvesting technology supported by wireless device 22 (e.g., vibrational energy harvester, thermo-electric generator, Indoor photovoltaic, RF energy harvester, etc.). In the case of RF energy harvesting, an indication could also include the type of RF energy harvesting, e.g., time-switching, power-splitting, or antenna switching. In case wireless device 22 is capable of harvesting RF energy over the 3GPP radio interface, i.e., the NR Uu, wireless device 22 may indicate a frequency range for which it may harvest energy. Wireless device 22 may furthermore indicate a preference (e.g., using UAI) for harvesting energy with a certain periodicity and time interval. Network node 16 may then use this information for providing wireless device 22 with a signal dedicated for energy harvesting configured according to wireless device preference.

Indication of a typical (e.g., average) amount of power, or maximum achievable power, or power range harvested by wireless device 22 and/or time required to replenish the battery to a suitable level when the harvested energy is used up. The indication can also include average time duration for which a fully charged wireless device 22 can sustain normal operation, i.e., perform transmission and/or reception. These capabilities may depend on the available power density (which may depend on the environment wireless device 22 is deployed in), source of harvested energy, and the form-factor of wireless device 22.

The information related to wireless device 22's energy harvesting capability can also include harvesting profile and cycle duration, e.g., timeline of charge/discharge stages. This may not exclude any possibilities that wireless device 22 may be equipped/designed with energy harvesting techniques that does not require wireless device 22 to explicitly enter a harvesting state.

In one or more embodiments, network node 16 is configured to respect the signaled energy harvesting capabilities while configuring/scheduling wireless device 22. These capabilities may be mandatory or optional for an energy harvesting wireless device 22 to support.

In one embodiment, wireless devices 22 operating on harvested energy is explicitly or implicitly identifiable to network node 16 through an early indication in Msg1 (message 1) and/or Msg3 (message 3) of the 4-step random access procedure, and MsgA (message A) (in the preamble part or the PUSCH part) of the 2-step random access procedure. Furthermore, this early indication of wireless devices 22 operating on harvested energy can be configured to be enabled/disabled via system information (e.g., system information block type 1 (SIB1)). Note that early indication of a RedCap wireless device 22 is already supported in Rel-17. Therefore, there may need to separate and/or different indications for RedCap wireless devices 22 operating on harvested energy, and RedCap wireless devices 22 that do not rely on harvested energy.

In one embodiment, an indication in the system information can be used to indicate specifically whether a RedCap wireless device 22 operating on harvested energy is allowed to camp on the cell/frequency or not.

In one embodiment, wireless device 22 capable of energy harvesting on the Uu radio interface indicates a preference to network node 16 for receiving an energy harvesting signal powering wireless device 22 before receiving a mobile terminated connection, e.g., via a page. Network node 16 may use this indication for transmitting the energy harvesting signal to wireless device 22 before attempting to initiate a connection to wireless device 22.

In one embodiment, a minimum level of stored energy is configured by network node 16 and communicated to wireless devices 22, e.g., in system information broadcast, which is the minimum that the harvesting wireless devices 22 must have in order to be allowed to access the network. That is, wireless device 22 would only be allowed to initiate an uplink transmission or connection attempt if the stored energy is greater than this configured threshold.

In one embodiment, the UAI can be at least one of the wireless device capability, or a periodic/semi-static/aperiodic configuration. For example, the UAI may be semi-static and be activated/deactivated using a MAC CE command.

In one embodiment, UAIs described herein can be reported periodically to network node 16 by wireless device 22. The period of this reporting can be determined based on the energy profile at wireless device 22.

In another embodiment, one or more (e.g., all) signaling optimizations mentioned above can be performed for wireless device 22 capable of energy harvesting using multiple energy harvesting sources.

Hence, while existing systems lack framework/signaling available for adapting the communication based on wireless device energy profile in NR (or in LTE), one or more embodiments described herein enable the network node to efficiently support wireless devices operating on harvested energy based at least on their energy profile. One or more embodiments described herein are beneficial for wireless device energy efficiency as well as network energy/spectral efficiency.

SOME EXAMPLES

Example A1. A network node 16 configured to communicate with a wireless device 22 (WD), the network node 16 configured to, and/or comprising a radio interface and/or comprising processing circuitry configured to:

receive information indicating that the wireless device 22 is an energy harvesting wireless device 22; and support the wireless device 22 based at least on the received information.

Example A2. The network node 16 of Example A1, wherein the support of the wireless device 22 includes at least one of:

configuring the wireless device 22 based at least on the received information;

providing energy harvesting signal power to the wireless device 22 before receiving a mobile terminated connection based at least on the received information;

providing energy harvesting signal power to the wireless device 22 before attempted to initiate a connection with the wireless device 22 based at least on the received information;

configuring the wireless device 22 to use a plurality of energy harvesting sources based at least on the received information; and scheduling the wireless device 22 based at least on the received information.

Example A3. The network node 16 of any one of Examples A1-A2, wherein the information includes at least one of:

an energy harvesting profile of the wireless device 22;

an energy harvesting type of the wireless device 22;

a wireless device 22 communication preference;

antenna panel information;

wireless device 22 capability for wake-up signaling;

wireless device 22 processing time capability; and an indication associated with release assistance information.

Example A4. The network node 16 of any one of Examples A1-A3, wherein the wireless device 22 communication preference includes at least one of:

a preference to temporarily suspend at least one of transmission and reception for a predefined duration of time while in a radio resource control_CONNECTED state;

a preference to be configured with a configured grant;

a preference to reduce uplink transmit power for one of an uplink shared channel and uplink control channel;

a preference to be configured with open-loop power control;

a preference to use half-duplex frequency division duplex, FDD, mode;

a preference to stop monitoring a downlink control channel in at least one transmission configuration indicator, TCI, state; and a preference for a downlink control channel aggregation level, AL.

Example A5. The network node 16 of any one of Examples A1-A4, wherein the received information corresponds to extended user equipment, UE, assistance information, UAI.

Example A6. The network node 16 of any one of Examples A1-A5, wherein the received information is received as part of a random access message.

Example A7. The network node 16 of Example A7, wherein the random access message is one of message 1 and message 3 of a random access procedure.

Example B1. A method implemented in a network node 16 that is configured to communicate with a wireless device 22, the method comprising:

receiving information indicating that the wireless device 22 is an energy harvesting wireless device 22; and supporting the wireless device 22 based at least on the received information.

Example B2. The method of Example B1, wherein the support of the wireless device 22 includes at least one of:

configuring the wireless device 22 based at least on the received information;

providing energy harvesting signal power to the wireless device 22 before receiving a mobile terminated connection based at least on the received information;

providing energy harvesting signal power to the wireless device 22 before attempted to initiate a connection with the wireless device 22 based at least on the received information;

configuring the wireless device 22 to use a plurality of energy harvesting sources based at least on the received information; and scheduling the wireless device 22 based at least on the received information.

Example B3. The method of any one of Examples B1-B2, wherein the information includes at least one of:

an energy harvesting profile of the wireless device 22;

an energy harvesting type of the wireless device 22;

a wireless device 22 communication preference;

antenna panel information;

wireless device 22 capability for wake-up signaling;

wireless device 22 processing time capability; and an indication associated with release assistance information.

Example B4. The method of any one of Examples B1-B3, wherein the wireless device 22 communication preference includes at least one of:

a preference to temporarily suspend at least one of transmission and reception for a predefined duration of time while in a radio resource control_CONNECTED state;

a preference to be configured with a configured grant;

a preference to reduce uplink transmit power for one of an uplink shared channel and uplink control channel;

a preference to be configured with open-loop power control;

a preference to use half-duplex frequency division duplex, FDD, mode;

a preference to stop monitoring a downlink control channel in at least one transmission configuration indicator, TCI, state; and a preference for a downlink control channel aggregation level, AL.

Example B5. The method of any one of Examples B1-B4, wherein the received information corresponds to extended user equipment, UE, assistance information, UAI.

Example B6. The method of any one of Examples B1-A5, wherein the received information is received as part of a random access message.

Example B7. The method of Example B7, wherein the random access message is one of message 1 and message 3 of a random access procedure.

Example C1. A wireless device 22 configured to communicate with a network node 16, the WD configured to, and/or comprising a radio interface and/or processing circuitry configured to:

transmit information indicating the wireless device 22 is an energy harvesting wireless device 22; and receive support, from the network node 16, that is based at least on the transmitted information.

Example C2. The wireless device 22 of Example C1, wherein the support includes at least one of:

a configuration for the wireless device 22 based at least on the transmitted information;

receiving energy harvesting signal power before transmitting a mobile terminated connection;

receiving energy harvesting signal power before the network node 16 attempts to initiate a connection with the wireless device 22;

a configuration for the wireless device 22 to use a plurality of energy harvesting sources based at least on the transmitted information; and a scheduling that is based at least on the transmitted information.

Example C3. The wireless device 22 of any one of Examples C1-C2, wherein the transmitted information includes at least one of:

an energy harvesting profile of the wireless device 22;

an energy harvesting type;

a wireless device 22 communication preference;

antenna panel information;

wireless device 22 capability for wake-up signaling;

wireless device 22 processing time capability; and an indication associated with release assistance information.

Example C4. The wireless device 22 of any one of Examples C1-C3, wherein the wireless device 22 communication preference includes at least one of:

a preference to temporarily suspend at least one of transmission and reception for a predefined duration of time while in a radio resource control_CONNECTED state;

a preference to be configured with a configured grant;

a preference to reduce uplink transmit power for one of an uplink shared channel and uplink control channel;

a preference to be configured with open-loop power control;

a preference to use half-duplex frequency division duplex, FDD, mode;

a preference to stop monitoring a downlink control channel in at least one transmission configuration indicator, TCI, state; and a preference for a downlink control channel aggregation level, AL.

Example C5. The wireless device 22 of any one of Examples C1-C4, wherein the transmitted information corresponds to extended user equipment, UE, assistance information, UAI.

Example C6. The wireless device 22 of any one of Examples C1-C5, wherein the transmitted information is received as part of a random access message.

Example C7. The wireless device 22 of Example C6, wherein the random access message is one of message 1 and message 3 of a random access procedure.

Example D1. A method implemented in a wireless device 22 (WD), the method comprising:

transmitting information indicating the wireless device 22 is an energy harvesting wireless device 22; and receiving support, from the network node 16, that is based at least on the transmitted information.

Example D2. The method of Example D1, wherein the support includes at least one of:

a configuration for the wireless device 22 based at least on the transmitted information;

receiving energy harvesting signal power before transmitting a mobile terminated connection;

receiving energy harvesting signal power before the network node 16 attempts to initiate a connection with the wireless device 22;

a configuration for the wireless device 22 to use a plurality of energy harvesting sources based at least on the transmitted information; and a scheduling that is based at least on the transmitted information.

Example D3. The method of any one of Examples D1-D2, wherein the transmitted information includes at least one of:

an energy harvesting profile of the wireless device 22;

an energy harvesting type;

a wireless device 22 communication preference;

antenna panel information;

wireless device 22 capability for wake-up signaling;

wireless device 22 processing time capability; and an indication associated with release assistance information.

Example D4. The method of any one of Examples D1-D3, wherein the wireless device 22 communication preference includes at least one of:

a preference to temporarily suspend at least one of transmission and reception for a predefined duration of time while in a radio resource control_CONNECTED state;

a preference to be configured with a configured grant;

a preference to reduce uplink transmit power for one of an uplink shared channel and uplink control channel;

a preference to be configured with open-loop power control;

a preference to use half-duplex frequency division duplex, FDD, mode;

a preference to stop monitoring a downlink control channel in at least one transmission configuration indicator, TCI, state; and a preference for a downlink control channel aggregation level, AL.

Example D5. The method of any one of Examples D1-D4, wherein the transmitted information corresponds to extended user equipment, UE, assistance information, UAI.

Example D6. The method of any one of Examples D1-D5, wherein the transmitted information is received as part of a random access message.

Example D7. The method of Example D6, wherein the random access message is one of message 1 and message 3 of a random access procedure.

Example E1. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Examples D1-D7 to receive the user data from the host.

Example E2. The host of the previous Example, wherein the cellular network further includes a network node 16 configured to communicate with the UE to transmit the user data to the UE from the host.

Example E3. The host of the previous 2 Examples, wherein:

the processing circuitry of the host is configured to execute a host application, thereby providing the user data; and the host application is configured to interact with a client application executing on the UE, the client application being associated with the host application.

Example E4. A method implemented by a host operating in a communication system that further includes a network node 16 and a user equipment (UE), the method comprising:

providing user data for the UE; and initiating a transmission carrying the user data to the UE via a cellular network comprising the network node 16, wherein the UE performs any of the operations of any of the Examples D1-D7 to receive the user data from the host.

Example E5. The method of the previous Example, further comprising:

at the host, executing a host application associated with a client application executing on the UE to receive the user data from the UE.

Example E7. The method of the previous Example, further comprising:

at the host, transmitting input data to the client application executing on the UE, the input data being provided by executing the host application, wherein the user data is provided by the client application in response to the input data from the host application.

Example E8. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of Examples D1-D7 to transmit the user data to the host.

Example E9. The host of the previous Example, wherein the cellular network further includes a network node 16 configured to communicate with the UE to transmit the user data from the UE to the host.

Example E10. The host of the previous 2 Examples, wherein:

the processing circuitry of the host is configured to execute a host application, thereby providing the user data; and the host application is configured to interact with a client application executing on the UE, the client application being associated with the host application.

Example E11. A method implemented by a host configured to operate in a communication system that further includes a network node 16 and a user equipment (UE), the method comprising:

at the host, receiving user data transmitted to the host via the network node 16 by the UE, wherein the UE performs any of the steps of any of Examples D1-D7 to transmit the user data to the host.

Example E12. The method of the previous Example, further comprising:

at the host, executing a host application associated with a client application executing on the UE to receive the user data from the UE.

Example E13. The method of the previous Example, further comprising:

at the host, transmitting input data to the client application executing on the UE, the input data being provided by executing the host application, wherein the user data is provided by the client application in response to the input data from the host application.

Example E14. A host configured to operate in a communication system to provide an over-the-top (OTT) service, the host comprising:

processing circuitry configured to provide user data; and a network interface configured to initiate transmission of the user data to a network node 16 in a cellular network for transmission to a user equipment (UE), the network node 16 having a communication interface and processing circuitry, the processing circuitry of the network node 16 configured to perform any of the operations of any of the Examples B1-B7 to transmit the user data from the host to the UE.

Example E15. The host of the previous Example, wherein:

the processing circuitry of the host is configured to execute a host application that provides the user data; and the UE comprises processing circuitry configured to execute a client application associated with the host application to receive the transmission of user data from the host.

Example E16. A method implemented in a host configured to operate in a communication system that further includes a network node 16 and a user equipment (UE), the method comprising:

providing user data for the UE; and initiating a transmission carrying the user data to the UE via a cellular network comprising the network node 16, wherein the network node 16 performs any of the operations of any of Examples B1-B7 to transmit the user data from the host to the UE.

Example E17. The method of the previous Example, further comprising, at the network node 16, transmitting the user data provided by the host for the UE.

Example E18. The method of any of the previous 2 Examples, wherein the user data is provided at the host by executing a host application that interacts with a client application executing on the UE, the client application being associated with the host application.

Example E19. A communication system configured to provide an over-the-top service, the communication system comprising:

a host comprising:

processing circuitry configured to provide user data for a user equipment (UE), the user data being associated with the over-the-top service; and a network interface configured to initiate transmission of the user data toward a cellular network node 16 for transmission to the UE, the network node 16 having a communication interface and processing circuitry, the processing circuitry of the network node 16 configured to perform any of the operations of any of Examples B1-B7 to transmit the user data from the host to the UE.

Example E20. The communication system of the previous Example, further comprising:

the network node 16; and/or the user equipment.

Example E21. A host configured to operate in a communication system to provide an over-the-top (OTT) service, the host comprising:

processing circuitry configured to initiate receipt of user data; and a network interface configured to receive the user data from a network node 16 in a cellular network, the network node 16 having a communication interface and processing circuitry, the processing circuitry of the network node 16 configured to perform any of the operations of any of Examples B1-B7 to receive the user data from a user equipment (UE) for the host.

Example E22. The host of the previous 2 Examples, wherein:

the processing circuitry of the host is configured to execute a host application, thereby providing the user data; and the host application is configured to interact with a client application executing on the UE, the client application being associated with the host application.

Example E23. The host of the any of the previous 2 Examples, wherein the initiating receipt of the user data comprises requesting the user data.

Example E24. A method implemented by a host configured to operate in a communication system that further includes a network node 16 and a user equipment (UE), the method comprising:

at the host, initiating receipt of user data from the UE, the user data originating from a transmission which the network node 16 has received from the UE, wherein the network node 16 performs any of the steps of any of Examples B1-B7 to receive the user data from the UE for the host.

Example E25. The method of the previous Example, further comprising at the network node 16, transmitting the received user data to the host.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| BWP | Bandwidth Part |
| C-RNTI | Cell Radio Network Temporary Identifier |
| CG | Configured Grant |
| CORESET | Control Resource Set |
| CSS | Common Search Space |
| DCI | Downlink Control Information |
| eMBB | enhanced Mobile Broadband |
| eRedCap | Enhanced Reduced Capability NR Devices |
| IE | Information Element |
| LPWA | Low power wide area |
| LTE | Long-Term Evolution |
| MAC-CE | Medium Access Control - Control Element |
| MICO | Mobile Originated Communication Only |
| MIMO | Multiple-Input and Multiple-Output |
| mMTC | massive Machine-Type Communication |
| Msg1 | Message 1during random access |
| Msg2 | Message 2 during random access |
| MTC | Machine-Type Communications |
| NB-IoT | Narrowband Internet of Things |
| NR | New Radio |
| NW | Network |
| RAI | Release Assistance Information |
| RedCap | Reduced Capability NR Devices |
| RRC | Radio Resource Control |
| PDCCH | Physical Downlink Control Channel |
| PUCCH | Physical Uplink Control Channel |
| PUSCH | Physical Uplink Shared Channel |
| RACH | Random Access Channel |
| PRB | Physical Resource Block |
| PSM | Power Saving Mode |
| RAR | Random Access Response |
| SDT | Small Data Transmission |
| SCS | Subcarrier Spacing |
| SI | System information |
| SIB | System information block |
| SRS | Sounding Reference Signal |
| SSB | Synchronization Signal Block |
| UAI | UE Assistance Information |
| UCI | Uplink Control information |
| UE | User equipment |
| URLLC | Ultra-Reliable Low-Latency Communication |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:

at least one processor and at least one memory, the at least one processor is configured to:

receive a first indication indicating that the wireless device is an energy harvesting wireless device, the first indication including a request of the wireless device to suspend one of a transmission, reception and measurement while the wireless device is in a radio resource control, RRC, connected state; and perform at least one action associated with energy harvesting at the wireless device based at least on the first indication, the performing of the at least one action including:

at a first time, suspending the one of the transmission, reception and measurement with the wireless device without releasing the wireless device to either of an idle state and an inactive state; and resuming the one of the transmission, reception and measurement after a predefined duration of time has elapsed from the first time.

2. The network node of claim 1, wherein the first indication includes an energy harvesting profile of the wireless device, the energy harvesting profile indicating at least one of:

an energy harvesting source type of the wireless device;

an energy harvesting rate of the wireless device;

an energy harvesting time interval of the wireless device;

an energy harvesting periodicity of the wireless device;

an energy harvesting time duration of the wireless device; and an energy depletion time duration of the wireless device.

3. The network node of claim 1, wherein the first indication includes a mapping of energy harvesting profiles to requested radio resource control, RRC, parameter sets; and the at least one processor being further configured to:

receive a second indication from the wireless device indicating a current energy harvesting profile of the wireless device; and the performing of the at least one action including:

modifying an RRC parameter set of the wireless device to one of the requested RRC parameter sets based on the mapping and the second indication.

4. The network node of claim 1, wherein the first indication includes a request of the wireless device to be configured with a configured grant in one of a radio resource control, RRC, connected, and RRC inactive state, the first indication further including a minimum time gap to the configured grant; and the performing of the at least one action including:

receiving an uplink data transmission from the wireless device based on the configured grant.

5. The network node of claim 1, wherein:

the at least one processor is further configured to:

at a first time, receive an indication of a time duration associated with a remaining energy level of the wireless device; and the performing of the at least one action including:

releasing the wireless device from a radio resource control, RRC, connected state after the time duration has elapsed from the first time.

6. The network node of claim 1, wherein the first indication is provided in user equipment, UE, assistance information, UAI, or in a random access message or via radio access capability signaling.

7. The network node of claim 1, wherein the first indication is received based on a power level of the wireless device falling below a first threshold.

8. A method implemented in a network node configured to communicate with a wireless device, the method including:

receiving a first indication indicating that the wireless device is an energy harvesting wireless device, the first indication including a request of the wireless device to suspend one of a transmission, reception and measurement while the wireless device is in a radio resource control, RRC, connected state; and performing at least one action associated with energy harvesting at the wireless device based at least on the first indication, the performing of the at least one action including:

at a first time, suspending the one of the transmission, reception and measurement with the wireless device without releasing the wireless device to either of an idle state and an inactive state; and resuming the one of the transmission, reception and measurement after a predefined duration of time has elapsed from the first time.

9. A wireless device configured to communicate with a network node, the wireless device comprising:

at least one processor and at least one memory, the at least one processor is configured to:

cause a transmission to the network node of a first indication indicating that the wireless device is an energy harvesting wireless device, the first indication includes a request of the wireless device to suspend one of a transmission, reception and measurement while the wireless device is in a radio resource control, RRC, connected state;

receive a configuration from the network node configured to cause the wireless device to perform at least one action associated with energy harvesting at the wireless device; and perform the at least one action in response to receiving the configuration, the performing of the at least one action includes:

at a first time, suspending the one of the transmission, reception and measurement with the wireless device without releasing the wireless device to either of an idle state and an inactive state; and resuming the one of the transmission, reception and measurement after a predefined duration of time has elapsed from the first time.

10. The wireless device of claim 9, wherein the first indication includes an energy harvesting profile of the wireless device, the energy harvesting profile indicating at least one of:

an energy harvesting source type of the wireless device, an energy harvesting rate of the wireless device, an energy harvesting time interval of the wireless device;

an energy harvesting periodicity of the wireless device;

an energy harvesting time duration of the wireless device, and an energy depletion time duration of the wireless device.

11. The wireless device of claim 9, wherein the first indication includes a mapping of energy harvesting profiles to requested radio resource control, RRC, parameter sets;

the at least one processor being further configured to:

cause transmission of a second indication to the network node indicating a current energy harvesting profile of the wireless device; and the performing of the at least one action including:

modifying an RRC parameter set of the wireless device to one of the requested RRC parameter sets based on the mapping and the second indication.

12. The wireless device of claim 9, wherein the first indication includes a request of the wireless device to be configured with a configured grant in one of a radio resource control, RRC, connected, and RRC inactive state, the first indication further including a minimum time gap to the configured grant;

the configuration including at least one configured grant based on the request and the minimum time gap; and the performing of the at least one action including:

causing transmission of an uplink data transmission from the wireless device based on the at least one configured grant.

13. The wireless device of claim 9, wherein the first indication includes a request to reduce uplink transmit power;

the configuration including one of a target received power, TPC, command, a target data rate, and a maximum output power based on the request to reduce uplink transmit power; and the performing of the at least one action including:

causing transmission of an uplink data transmission from the wireless device based on the one of the TPC command, target data rate, and maximum output power.

14. The wireless device of claim 9, wherein the first indication includes a request of the wireless device to change antenna panel activity when a power level of the wireless device falls below a first threshold; and the performing of the at least one action including:

determining a first multiple input multiple output, MIMO, configuration associated with a first number of layers;

determining that the power level of the wireless device has fallen below the first threshold;

causing transmission of a second indication to the network node indicating that the power level of the wireless device has fallen below the first threshold;

receiving, based on the second indication, a second MIMO configuration associated with a second number of layers fewer than the first number of layers; and causing a transmission to the network node based on the second MIMO configuration.

15. The wireless device of claim 9, wherein the first indication includes a request of the wireless device to use a maximum number of transmission configuration indication, TCI, states to monitor a physical downlink control channel, PDCCH;

the performing of the at least one action including:

receiving the PDCCH signaling from the network node based on the maximum number of TCI states.

16. The wireless device of claim 10, wherein the first indication includes a first processing time capability of the wireless device, a second processing time capability of the wireless device slower than the first processing time capability, and a time gap; and the performing of the at least one action including:

at a first time, communicating with the network node according to the first processing time capability; and communicating with the network node according to the second processing time capability after the time gap has elapsed from the first time.

17. The wireless device of claim 9, wherein the performing of the at least one action includes:

determining a first release information indicating a time duration associated with a remaining energy level of the wireless device;

at a first time, causing transmission of the first release information to the network node; and after the time duration has elapsed from the first time, receiving a release response from the network node, the release response being associated with the first release information and releasing the wireless device from a radio resource control, RRC, connected state.

18. The wireless device of claim 9, wherein the first indication includes a request of the wireless device to harvest radio frequency, RF, energy, the first indication indicating a periodicity for RF energy harvesting; and the performing of the at least one action including:

determining a schedule for receiving RF energy from the network node based on the periodicity; and receiving the RF energy from the network node based on the schedule.

19. A method implemented in a wireless device configured to communicate with a network node, the method comprising:

causing a transmission to the network node of a first indication indicating that the wireless device is an energy harvesting wireless device, the first indication including a request of the wireless device to suspend one of a transmission, reception and measurement while the wireless device is in a radio resource control, RRC, connected state;

receiving a configuration from the network node configured to cause the wireless device to perform at least one action associated with energy harvesting at the wireless device; and performing the at least one action in response to receiving the configuration, the performing of the at least one action including:

at a first time, suspending the one of the transmission, reception and measurement with the wireless device without releasing the wireless device to either of an idle state and an inactive state; and resuming the one of the transmission, reception and measurement after a predefined duration of time has elapsed from the first time.

* * * * *